United States Patent [19]

DeBell et al.

[11] Patent Number: 4,777,844
[45] Date of Patent: Oct. 18, 1988

[54] HYBRID CERAMIC/METAL COMPRESSION LINK FOR USE IN HIGHER TEMPERATURE APPLICATIONS

[75] Inventors: George C. DeBell, Plymouth; Edwin J. Ounsted, Dearborn, both of Mich.

[73] Assignee: Ford Motor Company, Dearborn, Mich.

[21] Appl. No.: 945,633

[22] Filed: Dec. 23, 1986

[51] Int. Cl.⁴ .............................. G05G 1/00; F16J 1/14
[52] U.S. Cl. ............................... 74/579 R; 74/579 E; 74/581; 74/586; 123/197 AB; 123/197 AC; 403/28; 92/187; 92/212; 92/222
[58] Field of Search ................ 74/579 R, 579 E, 581, 74/586, 594; 403/28, 29, 30, 342, 404; 92/212, 222, 187; 123/197 AB, 197 AC; 416/241 B

[56] References Cited

U.S. PATENT DOCUMENTS

| | | | |
|---|---|---|---|
| 3,632,143 | 1/1972 | Lessmann | 403/29 X |
| 3,698,264 | 10/1972 | York | 74/581 |
| 4,038,885 | 8/1977 | Jonda . | |
| 4,203,406 | 5/1980 | Smith | 123/197 AB X |
| 4,281,941 | 8/1981 | Rottenkolber | 403/29 |
| 4,292,368 | 9/1981 | Mialon . | |
| 4,350,056 | 9/1982 | Ban et al. . | |
| 4,391,161 | 7/1983 | Ban et al. . | |
| 4,404,935 | 9/1983 | Kraft | 92/248 X |
| 4,408,380 | 10/1983 | Schaper et al. . | |
| 4,414,860 | 11/1983 | Brunsch et al. . | |
| 4,424,003 | 1/1984 | Brobeck | 416/241 B |
| 4,425,820 | 1/1984 | Swozil . | |
| 4,428,275 | 1/1984 | Huperz et al. | 403/287 X |
| 4,436,443 | 3/1984 | McCormick | 403/14 |
| 4,437,438 | 3/1984 | Mederer | 123/197 AB X |
| 4,455,976 | 6/1984 | McCandless | 123/197 AB X |
| 4,458,555 | 7/1984 | Holtzberg et al. . | |
| 4,459,900 | 7/1984 | LaBouff | 92/187 X |
| 4,466,399 | 8/1984 | Hinz et al. | 92/212 X |
| 4,485,545 | 12/1984 | Caverly | 403/28 X |
| 4,499,646 | 2/1985 | Allor et al. | 403/28 X |
| 4,541,304 | 9/1985 | Chikugo et al. . | |
| 4,548,125 | 10/1985 | Huther | 92/187 |
| 4,614,453 | 9/1986 | Tsuno et al. | 403/30 |
| 4,632,590 | 12/1986 | Tsuchimoto | 403/30 |
| 4,651,629 | 3/1987 | Castarede | 92/212 X |
| 4,683,810 | 8/1987 | Afimiwala | 92/212 |
| 4,690,617 | 9/1987 | Oda et al. | 403/30 X |
| 4,694,678 | 9/1987 | Zeitlin | 74/581 X |

FOREIGN PATENT DOCUMENTS

| | | | |
|---|---|---|---|
| 3110096 | 9/1982 | Fed. Rep. of Germany | 416/241 B |
| 45-23474 | 8/1970 | Japan | 74/586 |

Primary Examiner—Gary L. Smith
Assistant Examiner—Rodney M. Lindsey
Attorney, Agent, or Firm—Joseph W. Malleck; Roger L. May

[57] ABSTRACT

A compression linkage is disclosed for use between a first swivel pin having a first thermal expansion characteristic and a second swivel pin of a second and differing thermal expansion characteristic, comprising: (a) a first shaft comprised of substantially the same material as the first pin and having a mateable end and another end adapted for swivel connection to said first pin; (b) a second shaft comprised of substantially the same material as the second pin and having a mateable end and another end adapted for swivel connection to said second pin; and (c) means providing a rigid compression joint between the mateable ends of said first and second shafts. Preferably, the first pin is adapted to operate in a high temperature environment, such as 400°–500° F., and is comprised of a ceramic effective to have a flexural strength of at least 100,000 psi (500 MPa) in such temperature range. The material for the second pin is preferably comprised of metal having a tensile strength of at least 550 MPa and a coefficient of thermal expansion in the range of 8–20 ppm/° K. The metal may be selected from the group consisting of high carbon steel and sintered powdered metal.

9 Claims, 3 Drawing Sheets

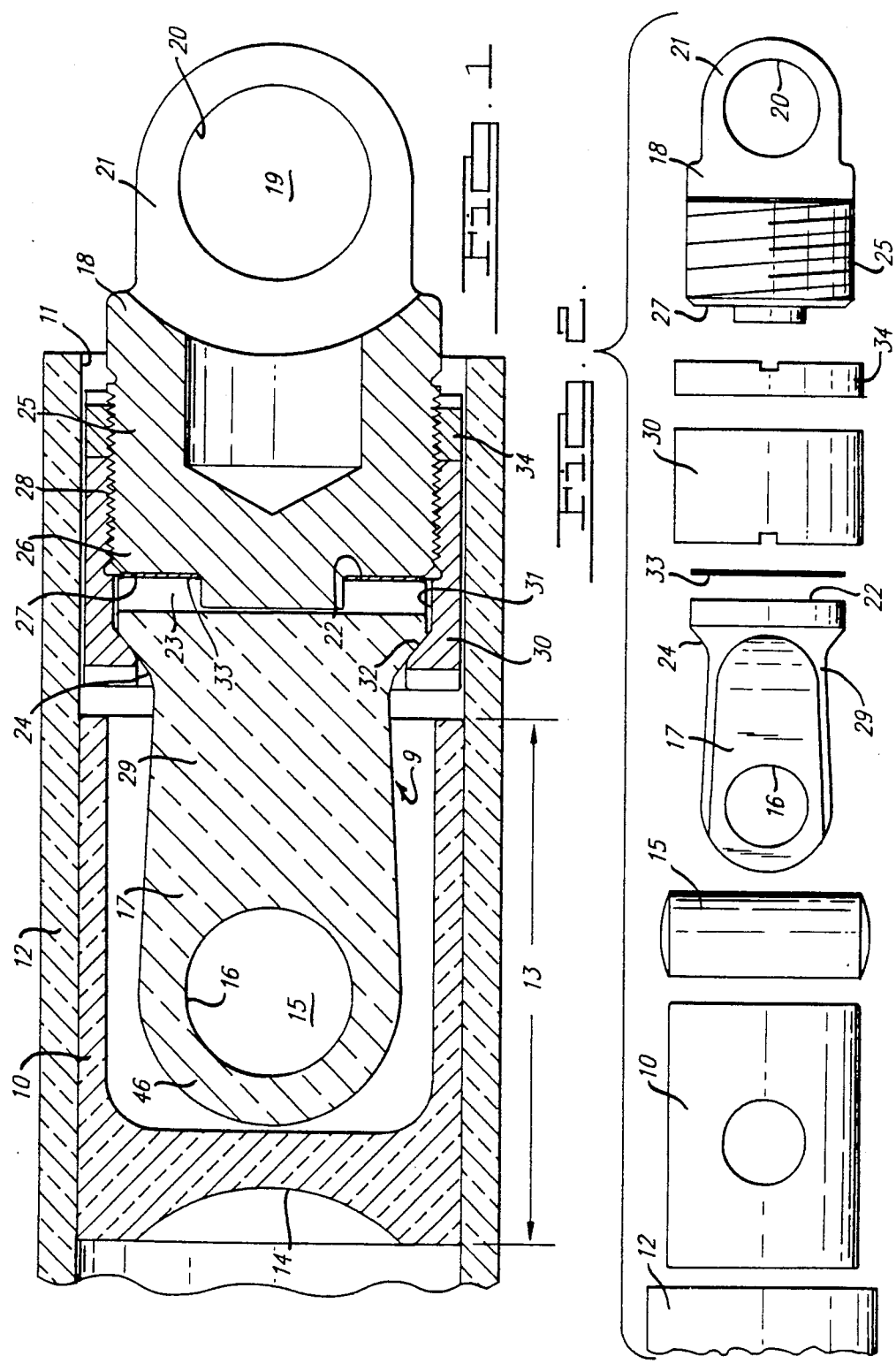

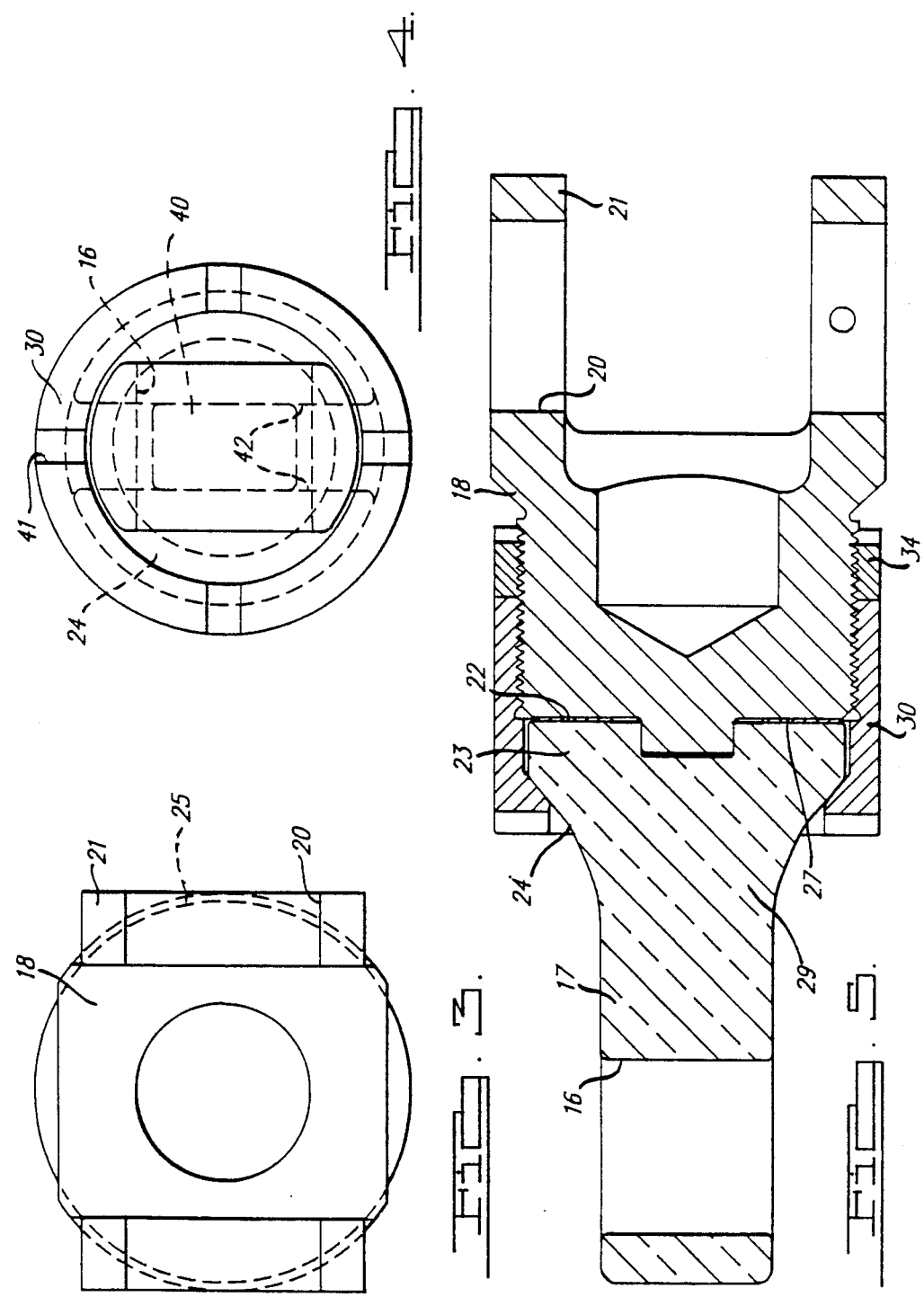

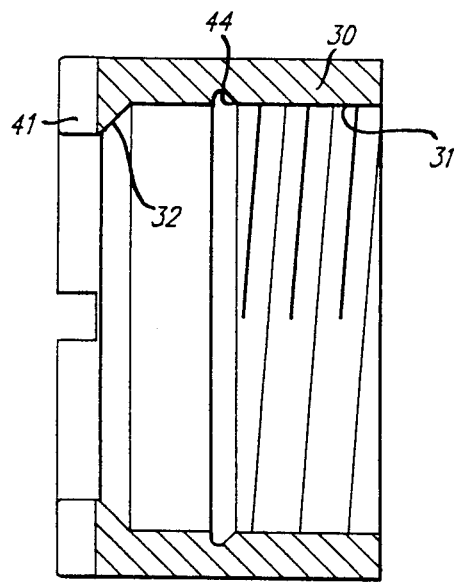
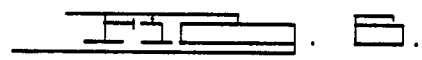
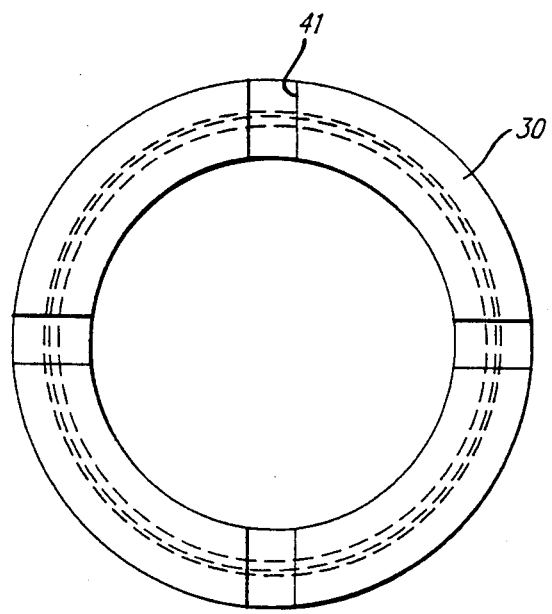

HYBRID CERAMIC/METAL COMPRESSION LINK FOR USE IN HIGHER TEMPERATURE APPLICATIONS

BACKGROUND OF THE INVENTION

1. Technical Field

This invention is directed to the art of making and designing force-transmitting links, such as connecting rods, which operate to a large extent in compression and, more particularly, to a link which is effective to (i) connect at one end to a ceramic member while exhibiting a thermal expansion characteristic similar to such ceramic member and (ii) connect at the other end to a metal member while exhibiting a thermal expansion coefficient similar to such metal member.

2. Description of the Prior Art

With the advent of new research into engines having ceramic components effective to operate regularly at higher temperatures, for achieving lower fuel consumption and for operating with a greater variety of fuels, there has arisen a need for mechanical linkage which is both compatible with ceramic components to which it will be connected and with metal components to which it also will be connected at locations more remote from the engine. Connecting rods are one type of such linkage that can serve this purpose. In the newly designed engines, the piston and the cylinder may be comprised of ceramic. In this manner the engine can eliminate the necessity for a water cooling system and permit the combustion chamber elements to operate at very high temperatures. Frequently, such engines are referred to as adiabatic, that is, power is generated by such engines through pressure and volume changes substantially without heat loss. Although ceramic components can operate admirably in this environment, the economy and physical properties of metallic components at lower temperatures make metal a better choice for linkage members elsewhere or remote from the combustion area except, possibly, in critical wear zones.

Connecting rods heretofore have been made entirely of one material or, at best, have substituted another material for metal throughout the shank of the connecting rod while retaining metal only as a bearing surface at the openings of the connecting rod. Forged and/or cast iron connecting rods have proven the standard in production for water cooled gasoline engines for many years. The environmental temperature at the end of the rod which connects to the metallic piston in such applications, never exceeds about 250° F. (see U.S Pat. No. 4,436,443). Iron connecting rods, made of powdered iron alloy, have been introduced recently as a manufacturing cost saver, but possess the same general expansion characteristics as the forged steel rods.

The difficulty that pervades all of the metal prior art connecting rod constructions is that the rod cannot be similar in thermal expansion characteristics to a ceramic piston or ceramic pin connecting to such piston. As a result, the metal rods give a hot clearance between the rod and ceramic pin which is excessive, with the result that the piston slaps the rod causing excessive wear and noise.

Considerable effort has been expended in designing connecting rods comprised substantially of reinforced plastics. In U.S. Pat. No. 4,458,555, the rod is made entirely of fiber-reinforced polymeric material. In U.S. Pat. Nos. 4,292,368; 4,038,885; 4,414,860; 4,425,820; 4,408,380; and 4,541,304, the disclosures employed fiber-reinforced plastic wound around metal sleeves for bearing surfaces or around a skeletal meal shank. In U.S. Pat. Nos. 4,350,056 and 4,391,161, bundles of silicon carbide reinforced plastic are cast-in-place with metal to form the connecting rod.

The major difficulty with fiber-reinforced plastic connecting rods, even if the plastic is used in a portin of the rod, is that such material prevents high temperature applications, such as to be experienced in a adiabtic diesel engine where the sustained temperatures at the connection of the rod to the pin will be about 500° F.

It is an object of this invention to provide a compression linkage useful between swivel pins of differing materials and accompanying differing thermal expansion characteristics. It is more particularly an object of this invention to provide a compression linkage which permits connection to a pin operating at an elevated temperature of at least 500° F. and connection to another pin operating in an environment substantially below said 500° F., the linkage effectively translating compression loads therebetween without interfering with the free floating characteristics of the swivel pins; such operating conditions will be present in a two-stroke engine, but can be present in other engines in varying degree depending on the design.

SUMMARY OF THE INVENTION

The invention provides a solution to the above objects by designing the compression linkage as a bipartite construction. One part of the construction is comprised of material substantially the same as the material of one of said pins operating at a high temperature and the other part is comprised of material substantially the same as the other pin operating in a lower temperature environment. The parts of said connecting rod are brought together at a compression joint which provides for rigid transmission of compression and tensile loads therebetween. The joint is arranged so that some of the difference in expansion characteristics is countered by the compression loading while accommodating any uncountered difference in a substantially rigid connection therebetween.

The compression linkage, for use between a first swivel pin having a first thermal expansion characteristic and a second swivel pin of a second and differing thermal expansion characteristic, comprises: (a) a first shaft, comprised of substantially the same material as the first pin, and shaped to have a mateable end and another end adapted for swivel connection to the first pin; (b) a second shaft, comprised of substantially the same material as the second pin, and shaped to have a mateable end and another end adapted for swivel connection to the second pin; and (c) means providing a rigid compression joint between the mateable ends of the first and second shafts.

Preferably, the first pin is adapted to operate in a high temperature environment, such as 400°–500° F., and is comprised of a ceramic effective to have a flexural strength of at least 100,000 psi (690 MPa) in such temperature range and a thermal expansion range of 2–3 ppm/°K. Preferably, the ceramic is selected from the group consisting of silicon nitride, silicon carbide, and sialon. Although the linkage of this invention is applied primarily in compression applications, the risk of failure, if any, of the connecting rod asembly will be at the ceramic pin in a bend or flexural mode and becomes a primary design consideration. The compression strength of such ceramics will be in excess of 300,000 psi and is not a primary design consideration.

The material for the second pin is preferably comprised of a metal having a tensile strength of at least 80,000 psi and a coefficient of thermal expansion in the range of 8-20 ppm/°K. The metal may be selected from the group consisting of high carbon steel, ductile of semiductile cast iron, and sintered powder metal.

Advantageously, one or more spacers may be interposed between the mateable ends of the shafts in a manner to provide a reduced thermal transfer therebetween. The spacer may be configured to provide a small air space therebetween, and may be selected from the group consisting of a malleable metal (dissimilar to the metal of the second shaft), and low thermal conductivity ceramics.

The ceramic shaft may have an axial load bearing face with steps therein to provide for proper angular orientation of the ceramic shaft with respect to the metal shaft. The metal shaft in turn may have a metallic yoke at an opposite end for connection to a swivel pin.

SUMMARY OF THE DRAWINGS

FIG. 1 is a central sectional view of a cylinder, piston, and connecting rod arrangement embodying the principles of this invention;

FIG. 2 is an exploded view of most of the parts of FIG. 1;

FIG. 3 is a right-end view of the connecting rod shown in FIG. 1;

FIG. 4 is a left-end view of the connecting rod shown in FIG. 1;

FIG. 5 is a top view of the construction shown in FIG. 1;

FIG. 6 is a central sectional view of the compression ring; and

FIG. 7 is an end view of the compression ring shown in FIG. 6.

DETAILED DESCRIPTION AND BEST MODE

A technology that is emerging as a potentially important development for passenger car engnes and light and heavy duty truck engines is that of the adiabatic diesel. Attempting to realize the benefits of adiabatic operation, ceramic materials are being introduced into the engine. The structural and heat insulating properties of these ceramic materials are expected to provide reductions in fuel consumption and other beneficial factors related to installation of the adiabatic engine in a vehicle such as reduction or elimination of cooling requirements, reduced diesel noise, tolerance to low quality fuels, and reduced emissions.

The total engine design and, in particular, the ceramic components could be simplified significantly by designing structural ceramic combustion chamber components for a two-stroke opposed piston diesel engine. In the uncooled version of the engine, the only ceramic components would be the cylinder and the pistons. The cylinder head and cylinder head gaskets, valve train, camshaft, and cooling system can be eliminated in this type of engine.

As shown in FIG. 1, the engine has ringless pistons 10 of sintered silicon nitride which have been contoured in an attempt to provide a minimum uniform clearance, to the cylinder wall 11, when at maximum operating temperature. However, the piston may also be formed of silicon carbide, sialon, or other equivalent structural ceramic composite.

A compression linkage 9 is employed between a first swivel pin 15 having a first thermal expansion characteristic and a second swivel pin 19 of a second and differing thermal expansion characteristic, comprising: (a) a first shaft 17 comprised of substantially the same material as the first pin 15 and having a mateable end 22 and another end adapted for swivel connection to said first pin; (b) a second shaft 18 comprised of substantially the same material as the second pin 19 and having a mateable end 27 and another end 21 adapted for swivel connection to said second Pin 19; and (c) means (30, 25, 24, 27) providing a rigid compression joint between the mateable ends of said first and second shafts.

Preferably, the first pin 15 is adapted to operate in a high temperature environment, such as 400–500° F., and is comprised of a ceramic effective to have a tensile strength of 350 MPa and a compression strength of at least 300,000 Psi (2070 MPa) in such temperature range. Ceramics useful for such pin applications may include (i) sintered $Si_3N_4$ having a thermal expansion characteristic of $2.6-3.0 \times 10^{-6} K^{-1}$, transverse rupture strength of 414–650 MPa, and (ii) sintered SiC having a thermal expansion characteristic of $4.3-5.6 \times 10^{-6} K^{-1}$, transverse rupture strength of 96–520 (at 300° K.) MPa. Most other ceramics have thermal expansion characteristics which are higher (greater than $7.0 \times 10^{-6} K^{-1}$) and make application design more difficult.

The material for the second pin 19 is preferably comprised of metal having a tensile strength of 550 MPa and a coefficient of thermal expansion in the range of $8-20 \times 10^{-6} K^{-1}$. The metal may be selected from the group consisting of high carbon steel, ductile of semiductile cast iron, and sintered powder metal. The piston pin 15 for the preferred embodiment was selected to have a diameter of 26 millimeters and is comprised of silicon nitride having a cold diametrical clearance with the journal opening 16 in the piston 10 of 0.010–0.013 millimeters (0.0004–0.0005 inch). This small clearance is to eliminate noise and wear and to provide a hot clearance that will allow free rotation.

For the preferred mode, the piston pin 15 and upper connecting rod 17 are formed from silicon nitride ceramic material having matched thermal expansion characteristics. The lower portion of the connecting rod or yoke member 18 is formed of high carbon steel metal and is adapted for swivel connection (by way of a metal pin 19 in the journal openings 20 of the yoke arms 21) to a train of connecting members (not shown) also made of the same metal and having matched thermal expansion characteristics. This type of assembly has the advantage of lighter weight, higher temperature operation at one end, and permits the use of a ringless piston for operation without conventional liquid (oil) lubrication, or with minimal oil lubrication.

The upper connecting rod 17 is formed with the journal opening 16 at one end 46 and an axial load bearing face 22 at the other end 23. The other end 23 is also configured to have a conical surface 24 surrounding the bearing face. The metallic yoke member 18 has a yoke arms 21 at one end provided with a pair of journal openings 20 through the yoke arms and has a shank 25 at the other end 26 with an axial load bearing face 27 effective to mate with the load bearing face 22 of the ceramic shaft 29. The metal yoke 18 has a threaded cylindrical surface 28 surrounding the load bearing face 27. The ceramic upper connecting rod 17 and the lower metal yoke member 18 are attached together by use of a unique metal sleeve 30 which has an internal surface 31 (threaded for only a portion up to stop 44) with a conical surface 32 effective to mate with the conical surface 24 of the ceramic shaft 29. When the sleeve 30 is threadably engaged with the threads of said cylindrical surface 28, and turned in such a direction so as to advance towards the metal yoke arms 21, the conical surface 32 will be drawn tightly against the conical surface 24 of the ceramic member promoting a compression seal or joint. The full force of the piston 10 is then evenly distributed across the interface bearing surfaces 22 and 27. To assist in locating the interfaces, a slot defined by walls 42 is provided in face 22, and nose 40 on the member 18 engages such slot. To assist in turning sleeve 30, wrench slots 41 are provided in one end.

The load that is transferred therebetween may be cushioned from localized point loading by use of an annular shim 33 or spacer which serves several purposes: (i) a mechanism to control the squish of the piston by changing the length of the connecting rod assembly, (ii) act as a heat insulator to promote an annual space internally thereof. Thus, an effective heat dam may be promoted to protect the metal yoke 18 from the higher temperatures expected from an adiabatic diesel engine. In addition, the metal spacer may be formed of a higher insulating material such as selected from the group consisting of a dissimilar malleable metal and low thermal conductivity ceramics. A locking nut 34 may also be employed to assure that the metal sleeve 30 does not unscrew during engine operation, thus ensuring that the upper ceramic rod 17 will be in intimate contact with the metal yoke member 18 under all loading conditions. The shims may vary in thickness from 0.005–0.031 inch.

Using a press-fit of a metal onnecting rod about a ceramic pin 15 to eliminate clearance therebetween, due to thermal expansion, causes loss of freedom for the pin to slide inside the piston (floating pin) and prevents the pin from freely rotating, which will minimize wear of the pin. The floating pin concept of this invention eliminates such problem, and also helps to distribute the load over the pin which will add to the reliability of the assembly.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

We claim:
1. A compression linkage, comprising:
    (a) a first swivel pin having a first thermal expansion characteristic and is a ceramic adapted to operate in a high temperature environment of at least 400°–500° F. and has a flexural strength of at least 100,000 psi in said temperature range;
    (b) a second swivel pin of a second and differing thermal expansion characteristic and is a metal having a tensile strength of at least 80,000 psi and a coefficient of thermal expansion in the range of 8–20 ppm/°K.;
    (c) a first shaft comprised of substantially the same material as the first pin and having a mateable end and another end adapted for swivel connection to said first pin;
    (d) a second shaft comprised of substantially the same material as the second pin and having a mateable end and another end adapted for swivel connection to said second pin; and
    (e) means providing a rigid compression joint between the mateable ends of said first and second shafts.

2. The linkage as in claim 1, in which said ceramic for said first pin is selected from the group consisting of silicon nitride, silicon carbide, and sialon.

3. The linkage as in claim 2, in which said metal for said second pin is selected from the group consisting of high carbon steel and sintered powdered metal.

4. A piston and connecting rod assembly for use in higher temperature engine applications, comprising:
    (a) a ceramic piston having a skirt with aligned journalled openings therein;
    (b) a dual material connecting rod having (i) a ceramic shaft with a journalled opening at one end and an axial load bearing face at the other end, said other end also having a conical surface surrounding said bearing face, (ii) a metallic yoke member having a yoke at one end and a shank at the other end with an axial load bearing face effective to mate with the load bearing face of said ceramic shaft, said metallic yoke having a threaded cylindrical surface surrounding said load bearing face, and (iii) a threaded metallic compression sleeve engaging said shaft conical surface threadably engaging said yoke and cylindrical surface to draw against said shaft conical surface and maintain said load bearing faces in rigid mated condition; and
    (c) a ceramic pin received in said journalled openings of said piston and shaft to permit swivel movement between said pin and either of said piston or shaft.

5. The assembly as in claim 4, in which said ceramic has a flexural strength of at least 100,000 Psi in the temperature range of 400°–500° F. and a thermal expansion characteristic equal to or less than $7.0 \times 10^{-6} K^{-1}$.

6. The assembly as in claim 4, in which said ceramic shaft is comprised of a cold pressed, isostatic pressed, cast, or injection molded sintered powdered ceramic.

7. The assembly as in claim 4, in which said metal for said yoke member and compression sleeve is selected from the group consisting of high carbon steel and sintered powder metal.

8. The assembly as in claim 4, which further includes insulating means disposed between said bearing faces and is selected from the group consisting of dissimilar malleable metal and low thermal conductivity ceramics.

9. The assembly as in claim 4, in which said higher temperature engine application is in the temperature range of 500° F. or greater at the location of the mating faces.

* * * * *